UNITED STATES PATENT OFFICE 2,605,228

PROCESS OF REDISPERSING A PRECIPITATED SILICA SOL

Guy B. Alexander, Parma, and Ralph K. Iler, Cleveland Heights, Ohio, assignors to E. I. du Pont de Nemours & Company, Wilmington, Del., a corporation of Delaware No Drawing. Application October 24, 1949, Serial No. 123,302

8 Claims. (Cl. 252—313)

This invention relates to the preparation of silica sols and is more particularly directed to processes wherein a dense silica having a particle size from about 10 to 150 millimicrons and which is associated with a positive ion is treated in the presence of water to remove the positive ion and to redisperse the silica to produce silica sols which are low in salts.

A number of processes are available for the production of silica sols which contain their silica in the form of dense particles above 10 millimicrons in size but which contain salts. It has been difficult, heretofore, to separate the salts from the sols.

One route to comparatively salt-free sols is described in Bechtold and Snyder, Serial No. 65,536, filed December 15, 1948, now Patent No. 2,574,902. This process involves the use of comparatively large amounts of ion-exchange resins and produces a low molecular weight silica sol which can be converted to a sol containing dense particles above 10 millimicrons by heating under the condition described in the Bechtold and Snyder application.

Another route to comparatively salt-free sols is described in the White Patent 2,375,738. Here a silica gel is first prepared by treatment of sodium silicate with acid. Salts are removed by washing and then the gel is repeptized by treatment with a solution containing hydroxyl ions. The particles of sols so produced are not as uniform and are not as dense as those prepared by the routes described in Bechtold and Snyder.

Now, as will be described in more detail hereinafter, processes have been developed for preparing sols of dense particles greater than ten millimicrons but the sols contain salts. Techniques have also been worked out, as will be explained below, for the precipitation of the silica particles in such sols. We have found that these precipitates can be expeditiously formed and handled and can be redispersed in water to form sols which are relatively salt-free.

A sol of dense silica particles can be prepared by neutralizing an alkali metal silicate with acid at an elevated temperature. At least eighty per cent of the alkali should be neutralized in a solution having an $SiO_2$ content from 0.4 to 4.0 per cent by weight and an alkali metal ion-concentration below 0.4 normal. A pH above 10.7 should be used during the reaction, and the temperature should be above 60° C. The time of heating must be at least $$\left(2^{\frac{95-T}{10}} \times 45\right)$$

where T is the temperature in degrees centigrade. The precise mode of preparing such sols is set out in detail in an application of Ralph K. Iler, one of the joint applicants of the present invention, in application Serial No. 99,349, filed June 15, 1949.

The silica sols formed contain comparatively large amounts of salts. It is an object of the present invention to separate the silica from the salts, and this is done by precipitation and redispersion.

In the Iler application above mentioned it is shown that the particles can be precipitated by increasing the alkali metal ion-concentration. If the amount of sodium, for instance, is increased, then the silica in the sol is caused to coagulate. If the alkali metal ion-concentration is above about 0.3 to 0.4 normal, the silica will no longer be present in a dispersed condition and can be separated from the solution.

It is also observed in the Iler application above mentioned that a salt of a polyvalent metal, such as calcium, magnesium, or zinc, may be added to coagulate the silica particles and to cause them to precipitate out. Any soluble salt may be used, such as the chlorides, sulfates, nitrates, and sulfamates.

Instead of forming the sol as in the Iler application above described, there may be used instead processes of the type described in an application of Guy B. Alexander, Ralph K. Iler, and Frederick J. Wolter, application Serial No. 99,350, filed June 15, 1949, now Patent No. 2,601,235. Alexander and Iler of that application are the joint inventors of the present application.

In preparing silica sols by the processes of the Alexander, Iler, and Wolter process, a heel of silica sol is heated above 60° C. and is mixed with an aqueous dispersion of active silica made by mixing an alkali metal silicate solution with enough acid to give a pH of 8 to 10.7, the alkali metal ion-concentration being below 1 normal in the presence of the active silica and the mixture of nuclei in the heel of silica sol and the active silica are heated above 60° C. at a pH of 8 to 10.7. The details of the process are set out in the said application of Alexander, Iler, and Wolter and need not be described at length at this point.

The alkali metal ion-concentration should be below 1 normal in the presence of the active silica and preferably should be below 0.4, or even better, below 0.3 normal. It is noted, additionally, that the temperatures and times used are similar to those in the first-mentioned application of Ralph K. Iler. Sols produced according to the processes of the Alexander, Iler, and Wolter application may be precipitated by the use of monovalent or polyvalent metals as described above.

The silica sols prepared as above described contain silica particles which are dense and which are surprisingly uniform in particle size. The density, that is the non-porous character, of the particles may be shown by drying them and then determining the amount of nitrogen absorption. This should be done in the absence of salts and for test purposes the salts can be removed by the use of ion-exchangers. From the nitrogen absorption it may be determined that the particles have a surface area not greatly in excess of that computed from the particle size as determined by electron micrograph. It will be evident that if the particles were not dense but were porous then the apparent surface as determined by nitrogen absorption would be much higher than that expected from the particle diameters. Nitrogen absorption, accordingly, affords an easy measure of the density of the particles. The preferred sols for use in the present invention have particles of such density that the surface area as determined by nitrogen absorption is not greatly in excess of that computed for the particle size as determined by examination with an electron micrograph and the absorption should preferably not be more than about thirty per cent greater than that computed from the apparent particle sizes.

The method of determining the surface area by nitrogen absorption is described in "A New Method for Measuring the Surface Areas of Finely Divided Materials and for Determining the Size of Particles" by P. H. Emmett in "Symposium on New Methods for Particle Size Determination in the Subsieve Range" in the Washington Spring Meeting of A. S. T. M., March 4, 1941.

The particles as determined by electron micrograph will have a particle size in excess of ten millimicrons and may have particle sizes as high as 150 millimicrons. Above about 150 millimicrons the particles separate from the solution. In the preferred sols for use according to the invention the particles are of comparatively uniform particle size within, as has been indicated, the range of 10 to 150 millimicrons.

Instead of preparing sols according to the processes outlined above one may advantageously follow processes of the invention using sols prepared in any of a variety of other ways. The sols may be produced by any process which yields silica particles in the range from about 10 to 150 millimicrons though, as has been indicated, it is desirable that the particles be as dense as possible.

For example, the White Patent 2,375,738 shows a process for the preparation of sols which can be used to prepare sols suitable for treatment according to the processes of the invention. According to the White patent a gel is first prepared. This gel is washed with water and then after a period of hours the gel is repeptized by the use of a solution containing hydroxyl ions. The removal of salts from a gel is a difficult operation and if the salts are not entirely removed from the gel they will, in part at least, appear in the finished sol. According to the present invention the silica particles of the sol can be precipitated by lowering the pH below 6, and preferably from 5 to 1.5, and using a polyvalent positive ion such as calcium, washed, and finally converted to a sol. The precipitated particles of sol are much easier to handle and to wash than a gel so that it is comparatively simple to remove undesired salts by washing of the precipitate. The advantages of processes of the invention are not as great using a sol such as that of White's because the particles are less uniform than those prepared by the other processes described and are less dense. The improvement is also smaller as the sols can be made nearly free of salts by careful washing.

Sodium, potassium, or ammonium compounds can be used as precipitants as has already been discussed. The minimum amounts required to effect precipitation can be used. These will ordinarily be found to amount to a quantity sufficient to give a normality of more than 0.4 or even 0.3 mols. These may be added in the form of any suitable salt such as sulfate, sulfamate, chloride, or as the salts of organic acids. Obviously, the salts of the alkaline metals may be present in considerable amount and often in sufficient amount to effect precipitation if the conditions of forming the sol are correctly chosen. They will of course result from the reaction of acid and sodium or potassium silicate. It will often be quite the easiest course to continue the addition of silicate and acid until the quantity of the salt of sodium and the acid become sufficiently concentrated to effect precipitation of the particles of the sol.

Instead of raising the alkali metal ion concentration by adding salt, the precipitation can be effected by increasing the effectiveness of the alkali metal ion by lowering the dielectric constant of the medium as by adding a water-miscible organic solvent. This is a desirable procedure in some instances because it does not add further quantities of salt which are, of course, the thing which we are seeking to remove. It should be noted that this effect is obtained only when the silica particles are negatively charged as when in a solution above pH 6. Suitable water-miscible organic solvents include lower alcohols, such as methyl, ethyl, propyl, or tertiary butyl alcohol; ketones such as methylethyl ketone, acetone, acetamide, ethers of ethylene glycol; and, in short, any water-miscible organic solvent which is of approximately neutral reaction.

In order to effect the precipitation of silica there may be used, as has previously been noted, various polyvalent metals. The silica particles are surface-reacted with the polyvalent metals. There should be employed the salt of a polyvalent metal, the hydroxide of which is substantially insoluble at pH 9.0. The salt must dissolve and ionize in water to give cations of the polyvalent metal. Titanium, for instance, does not so ionize and is not suitable. There may satisfactorily be used such metals as chromium, manganese, iron, cobalt, nickel, copper, zinc, aluminum, gallium, germanium, cadmium, indium, tin, antimony, mercuric mercury, plumbic lead, and bismuth.

The presence of agents such as metaphosphates which act to tie up and sequester in non-ionized form such metal ions is, of course, to be avoided. The chlorides, nitrates, sulfamates, salts of organic acids such as acetates, and other soluble salts of the polyvalent metals may be used.

To effect precipitation the polyvalent metal surface reacts with the silica particles. The mechanism of this reaction is not entirely clear, but it is known that the polyvalent metal is tightly held on the surface of the individual silica particles as if by chemical reaction. Thus, when a zinc salt is used as the precipitant the particles behave as if they had a surface coating of zinc silicate; whether there is actual chemical reaction or whether the zinc or other polyvalent metal is more loosely associated with the silica by a surface-reaction mechanism, it is sufficient to say that it is not merely present on the silica particles by occlusion, because it is not easily washed out.

The amount of polyvalent metal used to react with the silica depends in part on the size to which the silica particles have been built and in part on the character of the product desired. In general, the particles can be surface-reacted and precipitated by adding five per cent by weight of the polyvalent metal based upon the weight of $SiO_2$ present. Larger or smaller amounts of the polyvalent metal may be employed, but ordinarily the amount will be in the range from .1 to 10 per cent by weight based on the weight of $SiO_2$. The quantity to use for the purposes of the present invention can easily be determined by adding the polyvalent metal until precipitation is effected.

The surface-reaction of dense silica particles with polyvalent metals is covered in an application of Guy B. Alexander, Ralph K. Iler, and Frederick J. Wolter, Serial No. 99,351 filed June 15, 1949. Alexander and Iler are the joint applicants also of the present case. No need is seen to describe in detail the techniques which are fully set out in the said Alexander, Iler, and Wolter application and it seems sufficient here to incorporate by reference the portion of the said application which is relevant to the precipitation of silica particles.

Precipitation may alternatively be affected by the use of an alkaline earth metal having an atomic weight of from 20 to 150. By "alkaline earth metals" is meant the metals of the main group of Group II metals, as described by Latimer and Hildebrand, "Reference Book of Inorganic Chemistry," revised edition, page 57, and, with the atomic weight limitation, includes the metals magnesium, calcium, strontium, and barium—beryllium and radium being excluded. The metals may be added in the form of their soluble salts and should be added in an ionizable form. The presence of agents such as metaphosphates which act to tie up and sequester in non-ionized form such ions as calcium is, of course, to be avoided. The chlorides, nitrates, sulfamates, salts of organic acids such as acetates, and other soluble salts may be used. The amounts of the alkaline earth metal to use can be determined as with the polyvalent metals already described.

Generally, the amount of alkaline earth metal ion to use varies inversely with the size of the ultimate silica particles in the dispersion, so that as the particle size increases, the amount of alkaline earth metal ion required decreases. Also, as the concentration of silica in the dispersion increases the concentration of alkaline earth metal ion required decreases. The pH of the dispersion also influences the amount of alkaline earth metal ion to use, the amount increasing as the pH is lowered. The pH should not be permitted to go too high—say, above about 10.8, because depolymerization of the silica tends to occur at higher pH values with resultant precipitation of alkaline earth silicates. A pH in the range from 8 to 10.8 gives satisfactory results, the range from 9 to 10.5 being especially preferred. In these ranges, with ultimate silica particles of 10 to 150 millimicrons diameter and one per cent or more of silica in the dispersion, an amount of alkaline earth metal ion equivalent to five per cent, based on the weight of silica, will ordinarily be sufficient to effect surface-reaction to give a product suitable for use according to this invention. Lesser ion concentrations give correspondingly less complete coating of the silica particles or aggregates. For the purposes of the present processes coating is less important in most instances than the mere precipitation of the silica so that minimum amounts to effect precipitation can often be used.

A silica precipitate of particles from 10 to 150 millimicrons prepared in one of the manners above described will ordinarily be separated from the liquid phase of the sol by filtration or centrifuging. High temperatures should be avoided and freezing should be avoided. The precipitate should not be allowed to age any longer than necessary but should at once be redispersed according to the procedures described hereinafter.

The filter cake can be dried but this is not ordinarily a preferred mode of conducting the processes of the present invention. The surface tension forces are so great that the particles are compressed and do not readily redisperse. If a dry or fairly dry filter cake is wanted, then it is desirable to use larger amounts of the precipitant which by coating the silica particles with a monomolecular layer diminishes the amount of irreversible aggregation.

The filter cake or product separated by centrifuging will ordinarily be formed on the alkaline side and with the more alkaline reacting metal oxides such as magnesium or calcium the pH will be of the order of 9 or 10. For metals such as zinc or copper the pH will be of the order of 6 or 8. In order to wash the salts from the precipitate, the pH used should be such as will not remove the precipitating cation. Thus, calcium salt would be washed out preferably by maintaining a small amount of the coagulating agent. For instance, if a calcium compound was used to effect precipitation, then the wash water might contain a tenth of a per cent of calcium chloride at a pH of about 9 or 10. This will prevent any tendency to premature redissolution of the precipitate.

It should be observed also that while ordinarily it will be desirable to remove the salts by washing and will ordinarily be easy to do so, it is by no means imperative. Most of the salts in the liquid phase of the sol are separated by the filtration or centrifuging. The salts which remain can easily be removed from the solution later by the use of ion-exchange resins. It is much better to leave some of the salts with the precipitate than to effect too much drying or aging. If sodium or potassium salts are used as the precipitant, the most advantageous practice will be to centrifuge or else filter to obtain a rather wet filter cake. It will not normally be practical to wash such a precipitate since the washing will remove the precipitating cation and will immediately repeptize the silica.

There are two things generally which must be removed from the precipitate. One is the salt occluded from the liquid phase and the other is the precipitating cation. As has been observed above, the salt occluded can be removed by washing in many instances. To effect redissolution of the silica, the other thing can be removed in the precipitating cation. As has been noted already, the precipitating cation may be the same as the salt but ordinarily it will be a polyvalent metal.

With the monovalent metals such as sodium a sol can be prepared according to the present invention simply by adding water to the precipitate to make a sol of the desired concentration and immediately thereafter adding a cation-exchange resin. This can be followed with an anion-exchange resin to remove any occluded anion if desired.

With polyvalent metals or other positive ions which are more difficult to redisperse the precipitating ion can be removed in any of various ways to permit redissolution of the silica.

One method of redissolving the precipitate is of course the use of cation-exchangers. A slurry can be made of a precipitate which contains a small amount of calcium, barium, zinc, magnesium, or other precipitating ion. The slurry in contact with a cation-exchanger will quickly redisperse as the precipitating ion is abstracted by the cation-exchanger. The cation-exchanger can then be separated from the resulting sol by filtration or simple decantation. It will be seen that any remaining salt will also be removed at the same time and as has already been observed an ion-exchanger can be used to remove any remaining anion if this is desired.

The use of cation-exchangers in various relations is generally well understood and is described, for instance, in the Bird Patent 2,244,325 and in the Hurd Patent 2,431,481. Literature is also full of references to cation-exchangers and to their use.

Any insoluble cation-exchanger may be used in processes of the invention and there may be used, for instance, the salts of sulfonated carbonaceous exchangers or of sulfonated or sulfited insoluble phenol-formaldehyde resins or acid-treated humic material, or other similar exchangers. Sulfonated coal, lignin, peat, or other insoluble sulfonated humic organic material may be used.

Even more preferable are the insoluble resins made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups. Cation-exchangers which are stable in their hydrogen forms are available commercially under such trade names as "Amberlite," "Ionex," "Zeokarb," "Nalcite," "Ionac," etc.

The exchanger is generally prepared in a granular form which is readily leached free of soluble acids or salts. If the exchanger is exhausted by use it may readily be converted to the acid form by washing with a solution of an acid such as hydrochloric, sulfuric, formic, sulfamic, carboxylic, or the like.

One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November 1947, volume 69, No. 11 beginning at page 2830.

The exchanger can be initially in the acid form, in which case it will be desirable to adjust the pH of the resulting silica sol by the addition of an alkali. Alternatively, the exchanger can be in the sodium, potassium, or ammonium form if the precipitant is a polyvalent metal or an organic compound. This will be true, of course, only to the extent to which the presence of the alkali metals can be tolerated in the sol, and if too much of the precipitant is originally present then the acid form of resin should be used at least in part so that no undue excess of alkali metal will be introduced.

Since the sol is free of salt it may be adjusted to a temporary stability on the acid side or a more permanent stability on the alkaline side. On the acid side the pH would be from, say, 2 to 4, and on the alkaline side, say, 8 to 10. This is in accordance with known practices concerning silica sols.

Instead of removing the precipitant by the use of an ion-exchanger one may remove it as a precipitate with a compound with which it forms insoluble compounds. Barium, for example, can be withdrawn by treating a slurry of the precipitate with a slurry of sodium sulfate at pH 3. This will be effective provided the amount of barium does not exceed the amount of sodium which it is desired to introduce.

Sulfuric acid may be used which gives an insoluble barium compound without introducing sodium. If silver is used as the precipitant one can use hydrochloric acid, sodium chloride, or sodium bromide to form a more insoluble silver compound and remove it from the silica.

With barium as a precipitant one can use oxalic acid. In removing these materials it is generally desirable to use a lower pH as, for instance, by using the acid instead of the sodium or other salt because there is then less tendency to absorb the precipitant and sodium compounds.

Redissolution can also be effected by the treatment of the precitate with sequestering agents. Metaphosphate, for example, can be used to effect redissolution of a precipitate which contains calcium or iron or magnesium. A very small amount of, say, sodium metaphosphate will quickly redissolve the precipitate to form a sol. The metaphosphate will not be objectionable in some sols and can be left in the solution. If the metaphosphate is objectionable, then it can be removed by the use of a suitable anion-exchanger. Other sequestering agents can be used such as ethylene tetraacetic acid and nitrogen triacetic acid.

Still other methods can be used for separating the precipitants from the precipitate. For instance, the precipitate can be treated with acid and then the sol can be separated from salt by dialysis.

In order that the invention may be better understood, reference should be had to the following illustrative examples.

*Example 1*

The following is an example of the separation of colloidal silica from soluble salts by coagulation with a magnesium salt and repeptizing the silica by removing magnesium from the precipitate by means of a cation-exchange resin in the hydrogen form. The resulting sol is then stabilized by the addition of a small amount of alkali and concentrated.

A colloidal solution of silica containing soluble sodium salts was first prepared as follows:

A silicate solution was prepared by diluting commercial sodium silicate having a weight ratio of $SiO_2/Na_2O$ of 3.25, such that the $SiO_2$ content was 40 gm. per liter. This solution was heated to 95° C. and a solution of dilute $H_2SO_4$ (about 4.7 g. $H_2SO_4/100$ cc.) added over a period of 2 hours at a uniform rate, 1 volume of acid solution being added for each 3 volumes of silicate. The concentration of the acid was regulated so that about 80% of the $Na_2O$ in the silicate was neutralized. The final pH of the silica sol was about 10.2.

The particles of colloidal silica were dense, spherical, relatively uniform in size, having an average diameter of 21 millimicrons, and were discrete, separate, and non-aggregated.

One volume of this sol was coagulated by the addition of 0.05 part by volume of 0.5 molar magnesium chloride solution. The coagulation was conducted by adding the magnesium salt solution to the silica sol with vigorous agitation over a period of about 30 minutes at a temperature of 26° C., the pH of the mixture being about 10. The precipitate thus formed was filtered and washed essentially free from sulfate with distilled water.

One part by weight of the wet filter cake was then stirred up with 1 part by weight of distilled water and to this mixture there was added 0.2 part by weight of a cation exchange resin of the sulfonated polystyrene type in the hydrogen form. The pH of the slurry was adjusted to 8 by adding NaOH solution. The mixture was stirred for about 30 minutes, during which period the pH was maintained at 8, the temperature being 26° C. As the magnesium was removed from the precipitated silica, the silica was repeptized, giving a colloidal solution. The resin was then removed from the solution by filtration, and the solution was again treated with resin in a similar manner and again separated. The pH of the silica sol was then adjusted to 12 by the addition of 20% NaOH solution and heated whereupon the pH dropped to 10.8, and the turbidity decreased markedly. The pH was then lowered to 9.6 with ion-exchange resin in the acid form, then concentrated by evaporation of water until the concentration of $SiO_2$ reached 12.6%. A stable, translucent, slightly viscous colloidal solution was thus obtained.

Example 2

To a solution of colloidal silica containing soluble sodium salts prepared as described in Example 1, sodium sulfate was added until the total concentration of sodium ions in solution was 0.5 equivalent or 11.5 grams of sodium per liter. This required the addition of about 14.2 grams of $Na_2SO_4$ (anhydrous) per liter of sol. This mixture was heated for one hour at 95° C. until the colloidal silica was coagulated. This mixture was then filtered to recover the precipitate and the filtrate was discarded. The precipitate was then dispersed in a quantity of distilled water equal to the volume of a discarded filtrate. The solution was then deionized by stirring batchwise first with a cation-exchange resin in hydrogen form and then with an anion-exchange resin in the form of the free base. This deionization cycle was then repeated with fresh resins until the concentration of sodium sulfate was less than 0.6 grams of $Na_2SO_4$ per 100 grams of $SiO_2$ in the solution. During the deionization the silica became peptized, giving a stable colloidal solution. This solution was then rendered slightly alkaline by adding 1 normal sodium hydroxide solution, with vigorous agitation, until the pH reached 8.0. The solution was then concentrated by evaporating water until the $SiO_2$ concentration reached 15% by weight. A stable solution of colloidal silica was thus obtained.

Example 3

A silica sol containing a soluble sodium salt was prepared as in Example 1 and coagulated by the addition of 6% calcium chloride based on the weight of $SiO_2$ present, at a pH of 10. The precipitate was filtered and washed with distilled water until essentially free from chloride and sulfate ions. Care was taken that the filter cake remained in a moist condition. The moist filter cake was then mechanically dispersed in sufficient distilled water to give a concentration of $SiO_2$ of about 5% by weight. Dilute hydrochloric acid was then added to lower the pH to 2.0. Upon the addition of the acid, the precipitate dissolved, the silica becoming colloidally dispersed. This solution was then dialyzed against distilled water which was adjusted to a pH of 3.0 by the addition of a trace of hydrochloric acid until the sol was free from calcium ions.

The dilute solution of colloidal silica, now free from calcium ions, was removed from the dialyzer, adjusted to a pH of 8.0 by the addition of a small amount of dilute sodium hydroxide and concentrated by the evaporation of water until the concentration of $SiO_2$ was 15% by weight. A slightly turbid stable sol was obtained.

Example 4

A silica sol containing soluble sodium salts was prepared as in Example 1 except that hydrochloric acid was used instead of sulfuric acid and coagulated by the slow addition of a 2% solution of barium chloride. The amount of barium chloride required for complete precipitation of the silica was 8% by weight on the weight of the $SiO_2$ in solution. The barium-precipitated silica was filtered and washed with distilled water until the chloride content of the filter cake was less than 0.5 gram of sodium chloride per 100 grams of silica. The wet filter cake was then mechanically dispersed in an amount of water equal in weight to the weight of the wet filter cake. This solution was then analyzed for barium and a quantity of sulfuric acid 5% in excess of that required to precipitate all the barium as barium sulfate, was added. The sulfuric acid was added to the mixture as a 5% solution, addition being conducted with vigorous agitation of the suspension of precipitate. As the acid was added, barium sulfate was precipitated and the precipitated silica was peptized. The mixture was permitted to stand with gentle stirring for a period of 3 hours and the barium sulfate was then removed by filtration. The silica sol, obtained as the filtrate, had a pH below 5. The pH was adjusted to 8 with NaOH solution and then concentrated by the evaporation of water until the concentration of $SiO_2$ was 10% by weight. A stable sol, translucent when observed in thin layers, was obtained.

Example 5

A silica sol containing a soluble sodium salt was prepared as in Example 1. The pH of the sol was then adjusted to 8.5 by the addition of a small quantity of sulfuric acid. To this sol was added, with vigorous agitation and at a temperature of about 30° C., 10% by volume of tertiary butyl alcohol. The colloidal silica was precipitated in a flocculent condition and was recovered from the solution by filtration. The wet filter cake was immediately washed with a mixture of tertiary butyl alcohol and water containing 10% by volume of the alcohol, until essentially free from sulfate ions. One part by weight of the wet filter cake was then mixed with 2 parts by weight of distilled water and the alcohol was removed by rapid distillation using a fractionating column so as to remove the alcohol as the alcohol-water azeotrope. During distillation, the precipitate redispersed, giving a colloidal solution of silica. Then distillation was continued in order to remove water until the silica concentration reached 10% by weight. A stable, slightly viscous, translucent sol was produced.

In this example it will be noted that coagulation was effected by adding a water-miscible organic solvent such as tertiary butyl alcohol. Actually, coagulation was brought about by a joint action of the alcohol and the sodium ions in solution since in the absence of sodium ions alcohol will not coagulate colloidal silica. This demonstrates that coagulation by cations can be effected not only by increasing the concentration of cations in the solution as in the previous examples, but also by adding a water-miscible organic solvent which accentuates the coagulating tendency of the cations which, in the absence of solvents, would not alone effect precipitation.

*Example 6*

A silica sol was prepared and coagulated by the addition of calcium chloride as in Example 3. The precipitate was filtered and washed as in Example 3 and the wet filter cake then mechanically dispersed in an equal volume of distilled water. To this suspension there was then added 0.2 part by weight of air-dried sulfonated polystyrene ion-exchange resin in the hydrogen-ion form per 1 part of solution. Rapid exchange of hydrogen and calcium ions occurred, the precipitate passing into solution, giving a colloidal solution of silica. The sol was then treated with a freshly regenerated anion-exchange resin to remove traces of hydrochloric and sulfuric acid. The mixture was then filtered to remove the ion-exchange resin and the filtrate evaporated until the concentration of $SiO_2$ was 15% by weight. A stable silica sol was thus obtained.

*Example 7*

A silica sol containing sodium sulfate was prepared as in Example 1. To 1 part by weight of this sol there was added 0.03 parts by weight of a freshly prepared 2% solution of aluminum chloride. During this addition the temperature of the mixture was 35° C. and the addition of the aluminum chloride was made while the silica sol was vigorously stirred. The silica was rapidly coagulated by the aluminum salt. The precipitate was recovered by filtration and washed until the filtrate was free from chloride and sulfate ions. The freshly obtained wet filter cake was then mixed with an equal volume of distilled water and the mixture acidified by the addition of 10% hydrochloric acid until the pH was 3.0. To 10 parts of this mixture there was then added 1 part by weight of sulfonated polystyrene ion-exchange resin in the hydrogen form. The mixture was stirred for 3 hours. The resin was permitted to settle from the solution and the supernatant liquid was then separated and treated with 1 part by weight of an anion-exchange resin in basic form. The mixture was then stirred for one hour. The mixture was then filtered and the filtrate, which was a dilute silica sol, was adjusted to pH 8 by the addition of a small amount of dilute sodium hydroxide solution. The solution was then concentrated by the evaporation of water until the concentration of silica was 10% by weight. A slightly turbid but stable silica sol was produced.

We claim:

1. In a process for the preparation of a silica sol, the steps comprising treating in the presence of water a precipitated silica of 10 to 150 millimicrons particle size surface reacted with a metal ion to remove the metal ion and to thereby redisperse the silica.

2. In a process for the preparation of a silica sol, the steps comprising mixing with water a precipitated silica of dense particles of 10 to 150 millimicrons surface reacted with a polyvalent metal ion, and removing the metal ion to thereby redisperse the silica.

3. In a process for the preparation of a silica sol, the steps comprising mixing with water a precipitated silica of dense particles of 10 to 150 millimicrons surface reacted with a metal ion, and removing the metal ion with a cation-exchanger to thereby redisperse the silica.

4. In a process for the preparation of a silica sol wherein a metal compound is added to a silica sol containing salt and dense particles of silica of 10 to 150 millimicrons to co-precipitate the silica and the metal, the steps comprising removing the metal from the silica in the presence of water to thereby form a silica sol.

5. In a process for the preparation of a silica sol from a precipitate of silica of dense particles of 10 to 150 millimicrons and which are surface reacted with a metal ion, the steps comprising treating the precipitate in the presence of water with a cation-exchanger to thereby redisperse the silica.

6. In a process for the preparation of a silica sol from a precipitate of silica of dense particles of 10 to 150 millimicrons and which are surface reacted with a metal ion, the steps comprising treating the precipitate in the presence of water with a cation-exchanger to remove the said metal ion thereby to redisperse the silica as a sol.

7. In a process for the preparation of a silica sol from a precipitate of dense particles of 10 to 150 millimicrons and which are surface reacted with a metal ion, the steps comprising treating the precipitate in the presence of water with a reactant which will form an insoluble compound with the metal ion thereby to redisperse the silica as a sol.

8. In a process for the preparation of a silica sol from a precipitate of dense particles of silica of 10 to 150 millimicrons which have been produced by the precipitation of a sol of the particles with a polyvalent metal the hydroxide of which is insoluble at pH 9 whereby the silica particles are surface reacted with the metal and precipitated, the step comprising treating the precipitate in the presence of water with a sufficient amount of a cation-exchanger to remove the said metal and to thereby redisperse the silica as a sol.

GUY B. ALEXANDER.
RALPH K. ILER.

REFERENCES CITED

The following references are of record in the file of this patent:

UNITED STATES PATENTS

| Number | Name | Date |
|---|---|---|
| 2,244,325 | Bird | June 3, 1941 |
| 2,375,738 | White | May 8, 1945 |